Jan. 9, 1940.  E. CHAPMAN  2,186,008
CAR TRUCK
Original Filed Aug. 23, 1934   3 Sheets-Sheet 1
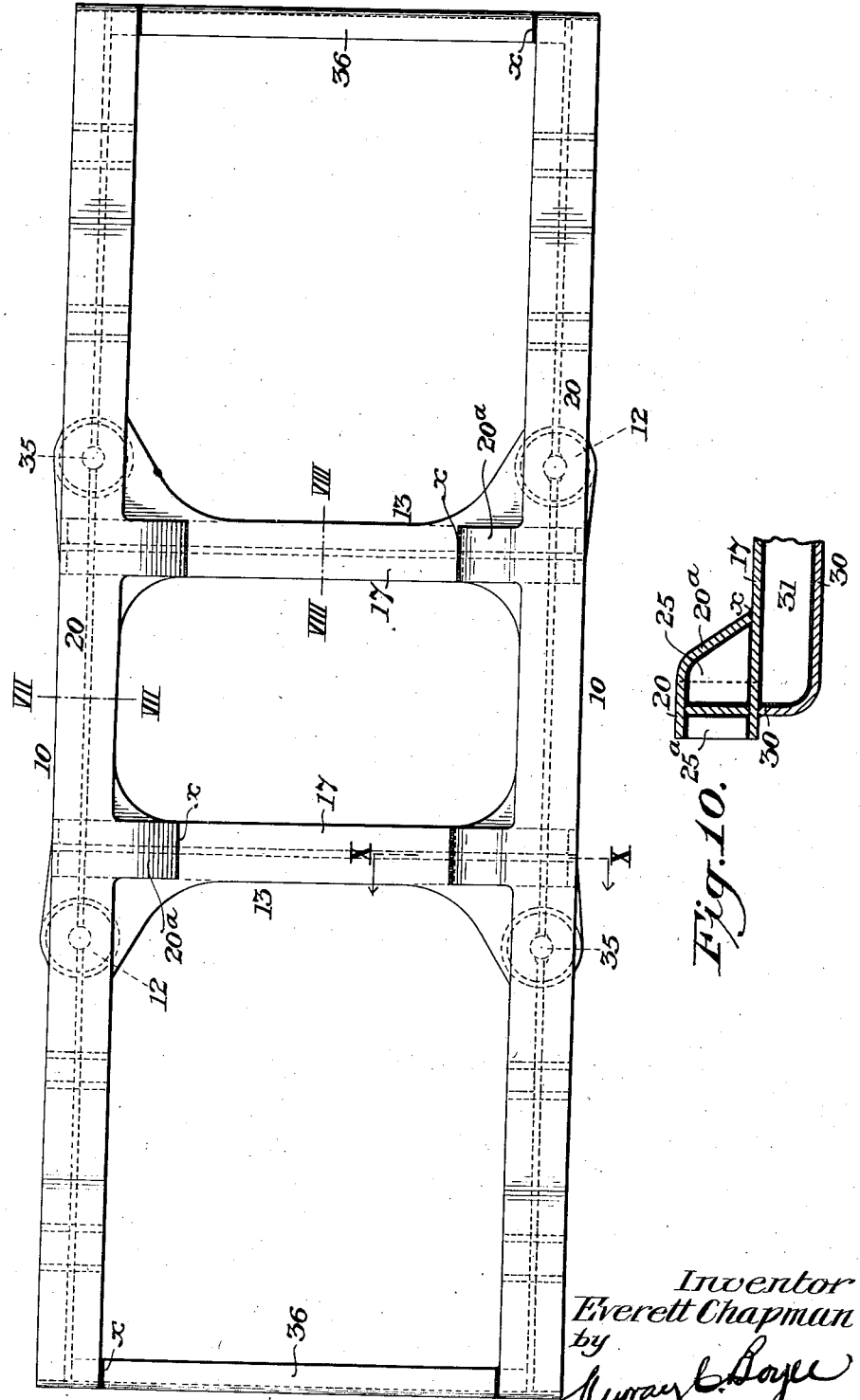
Inventor
Everett Chapman
by
Atty.

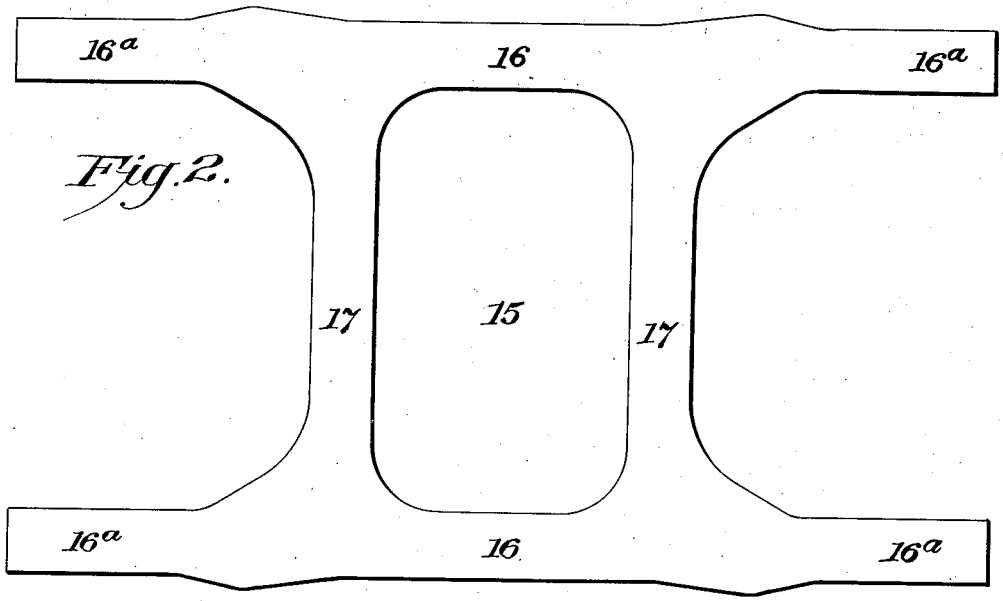
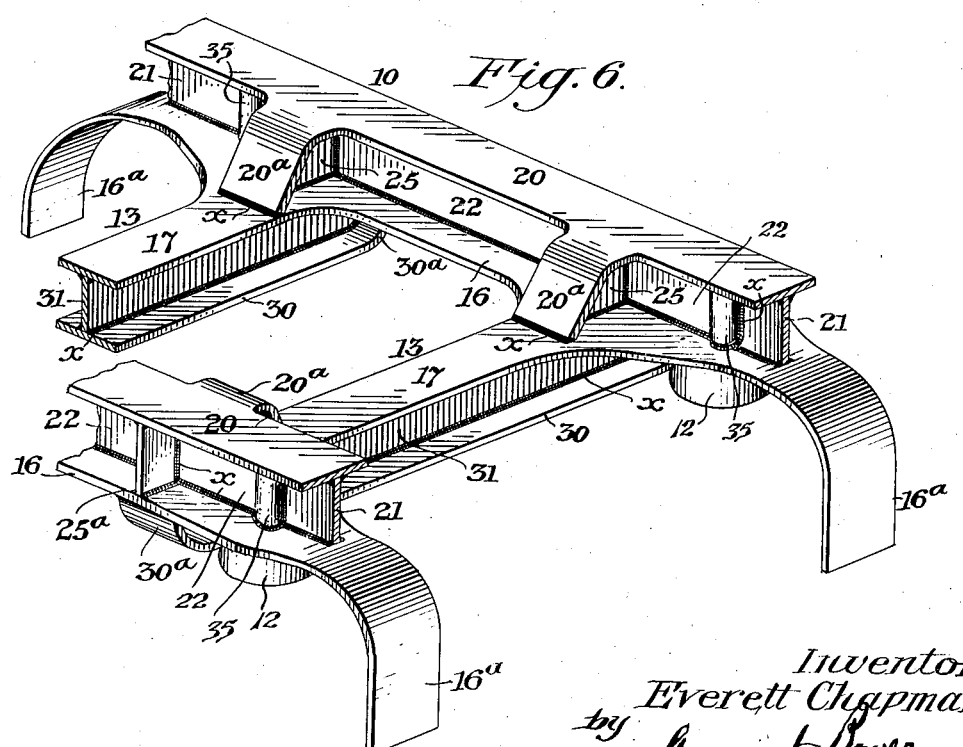

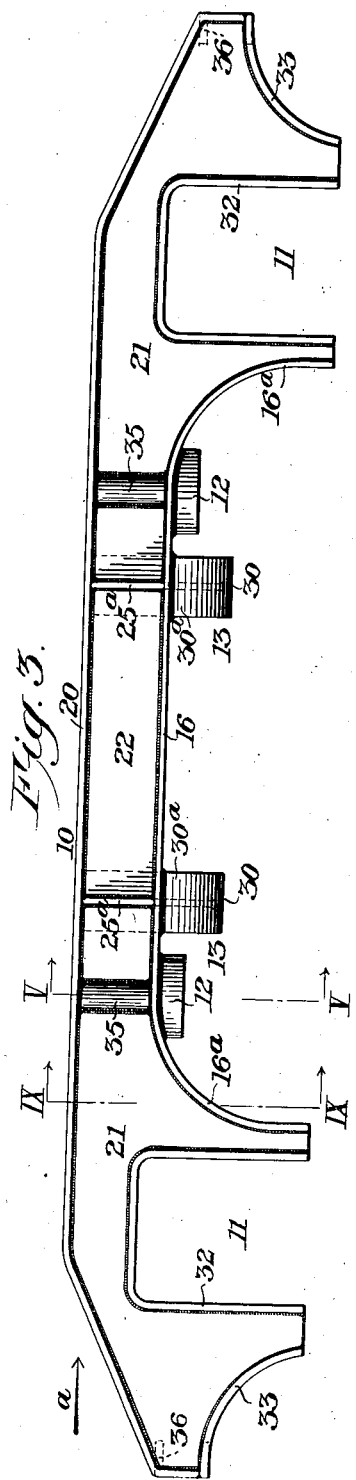
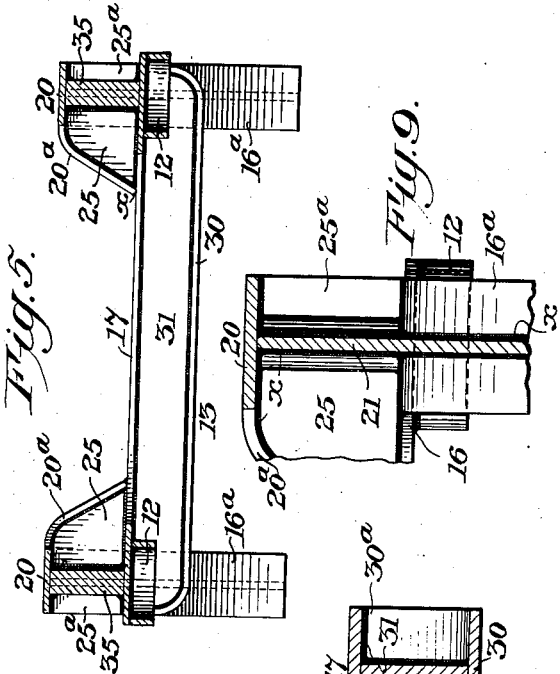
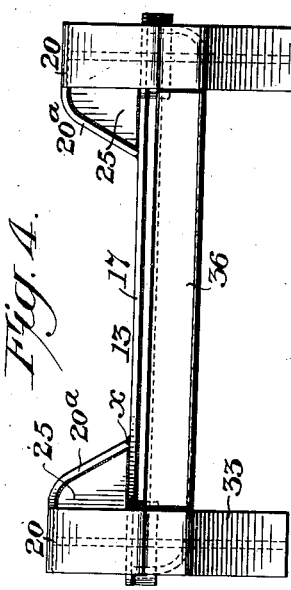
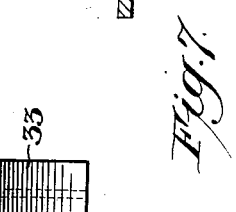
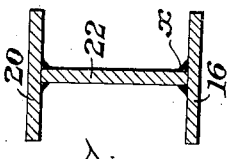

Patented Jan. 9, 1940

2,186,008

UNITED STATES PATENT OFFICE 2,186,008

CAR TRUCK

Everett Chapman, Coatesville, Pa.

Application August 23, 1934, Serial No. 741,164
Renewed April 3, 1939

23 Claims. (Cl. 105—206)

My invention relates to car truck frames and comprises an improved construction involving the use of rolled plate sections developed into side members and connecting transoms, which plate sections are secured together, by welding or otherwise, to form a unitary structure.

My improved construction involves the production of frame elements which may have their principal parts or members substantially in the form of an I-beam in cross section, and includes a continuous member of special shape having portions which form a part of the base or what may be termed the lower chords of the side members at the central part of the same, and transversely disposed portions which form the top or what may be termed the upper chords of the transoms.

The object of my invention is to provide a unitary structure whose design provides maximum resistance to the stresses to which structures of such type may be subjected.

These and other features of my invention are more fully described hereinafter; reference being had to the accompanying drawings, more or less diagrammatic in character, in which:

Figure 1 is a plan view of a truck frame within the scope of my invention.

Fig. 2 is a plan view of one of the elements of the truck frame.

Fig. 3 is a side elevation of the truck frame.

Fig. 4 is an end view of the truck frame looking in the direction of the arrow $a$, Fig. 3.

Fig. 5 is a sectional view on the line V—V, Fig. 3.

Fig. 6 is a fragmentary perspective view of a detail of my invention.

Figs. 7, 8 and 9 are enlarged sectional views on the lines VII—VII, VIII—VIII, Fig. 1, and IX—IX, Fig. 3, respectively, of details of my invention, and Fig. 10 is a sectional view of a modified detail, which may be said to be taken on the line X—X, Fig. 1.

An essential feature of my invention is the production of a unitary frame for car trucks made up of rolled metal sections of the desired shape, preferably welded together. In the accompanying drawings, I have illustrated my improvements as applied to one form of truck frame, and it will be understood that the features of my invention may be embodied in other forms of truck frames without departing from the essential features thereof.

My improved truck frame includes side members 10, having the usual journal-box receiving recesses 11, and may carry spring-receiving pockets 12, at one side of such recesses. Substantially centrally of the side members and arranged between the same are transverse elements constituting the transoms 13; such transoms being disposed below the upper plane of said side members. The several portions of the frame are made of rolled plate sections, preferably welded together to form a unitary structure; the main elements of which may be developed substantially into what may be termed I-beam (or box-like) sections.

An important feature of the improved truck frame forming the subject of my invention is the use of a continuous member 15, more particularly illustrated in Fig. 2, which member constitutes the central element of the frame and may comprise longitudinal side portions 16 in parallel relation which form the base portions or lower chords of the central part of the side members 10, and transverse connecting portions 17, also in parallel relation, which constitute the top portions or upper chords of the transoms 13. The ends of the side portions 16 are downwardly curved and flank one side of the journal-box receiving recesses 11, as indicated at 16ª. The member 15 is preferably in the form of a single element of rolled plate metal of the required thickness, but it is within the scope of my invention to provide a continuous member of the shape or substantially the shape shown in Fig. 2, made of preformed pieces of rolled metal of the required shape, edge-welded together.

The side members of the frame are made up of plate elements 20 forming upper chords, which may be of the shape illustrated in Figs. 1, 3 and 6; each of said members 20 extending longitudinally of the frame in parallel relation and overlying and being connected to web elements 21 and 22 which, in turn, are secured, as by welding, to the longitudinal portions 16 and 16ª of the member 15. The members 20 have short laterally extending portions 20ª on their inner sides which are bent over and welded to the transverse portions 17 of the members 15; such portions 20ª with interposed vertical web members 25, forming knee braces between the side members and the transoms. Short vertical web sections 25ª may be interposed between the top and bottom members 20 and 16 on the outside of the side members and in line with the webs 25.

The lower chords of the transoms comprise plate members 30 having their ends 30ª curved and brought into contact with the underside of the longitudinal side portions 16 of the member 15. The connecting portions of these curved ends 30ª may be brought into line with the outer margin of the upper and lower chords of the side members, as shown in Figs. 4 and 5, or aligned with the webs 22 between the upper and lower chords 20 and 16, respectively, as shown in Fig. 10. Between the plate members 30 forming the lower chords and the transverse connecting portions 17 forming the upper chords of the transom members, vertical webs 31 are placed and welded to the respective members.

The side members are provided with journal-box receiving recesses 11; the inner portion of which includes U-shaped plate elements 32 welded to the vertical plate sections 21 forming part of the web of said side members. The ends of the web members 21 may have curved flange-forming plates 33 secured to the same to complete the ends of the side members.

The spring-receiving pockets 12 may be carried by the side members 16 of the truck frame and, by preference, the portion forming the upper part of these pockets is surmounted by sections 35 of bar metal which may be circular in cross section and welded to the respective web sections 21 and 22 and to the parts forming the upper and lower chords of said side members.

The ends of the side members may be connected together by transverse elements 36 of suitable cross sectional contour which may be welded to such ends and may be disposed substantially in the same plane as the transverse members forming the transoms.

The several plate sections which are assembled to form my improved car truck frame may be welded together at their meeting points, as indicated at x, and it will be understood that such welding may be effected by any suitable means common in the art.

Various modifications may be made in the foregoing embodiment of my invention without departing from the spirit and scope thereof as set forth in the appended claims.

I claim:

1. A car truck frame including side members and a plurality of transverse members constituting transoms, each of said members being made up of horizontally and vertically disposed plate sections welded together and having substantially an I-beam cross-section, the lower chords of said side members being continuous with the upper chords of said transoms.

2. A car truck frame comprising a unitary structure consisting of longitudinal side members in spaced parallel relation, and transverse transom members in spaced parallel relation and disposed substantially at a right angle to the side members, with a continuous plate element forming the lower part of the side members and the upper part of said transom members.

3. A car truck frame comprising a unitary structure consisting of longitudinal members in spaced parallel relation, and transverse transom members in spaced parallel relation and disposed substantially at a right angle to the side members and equidistant from the ends of the same, with a continuous plate element forming the lower part of the central portions of the side members and the upper part of said transom members.

4. A car truck frame comprising a unitary structure consisting of longitudinal side members in parallel relation, and transverse transom members in parallel relation and disposed substantially at a right angle to said side members; the central portion of said side members and the transoms being substantially I-shape in cross section, with a continuous element forming the lower chords of the central portions of the side members and the upper chords of said transom members.

5. A car truck frame including side members substantially I-shape in cross section including upper and lower chords and a connecting web, and transom members substantially I-shape in cross section comprising upper and lower chords and a connecting web disposed transversely between said side members, wherein the lower chord of the side members is an integral element continuous with the upper chords of the transom members.

6. In a car truck frame as set forth in claim 1, in which the upper chords of the side members have laterally projecting portions bent over and secured to the transom members to form knee braces.

7. A car truck frame as set forth in claim 1, in which the ends of the lower chords of the transom members are bent into engagement with and secured to the lower chords of the side members.

8. A car truck frame as set forth in claim 1, in which the upper chords of the side members have laterally projecting portions bent over and secured to the transom members to form knee braces, with vertical webs interposed between said bent over portions and the upper chords of the transom members.

9. A car truck frame having built-up transoms including top and bottom elements and built-up side members including top and bottom elements connected therewith in which the bottom element of the side members is coplanar with the top element of the transoms and is welded to the respective parts making up such side members and transoms.

10. A car truck frame including built-up side members with journal-box-receiving recesses, and built-up transverse members forming transoms; said transoms having parallel portions forming an integral part of each of the side members with downwardly bent ends disposed adjacent to the journal-box-receiving recesses thereof.

11. A car truck frame including built-up side members with journal-box-receiving recesses and including continuous upper chords, built-up transverse members forming transoms; said transoms having parallel side portions forming an integral part of each of the side members with downwardly bent ends disposed adjacent to the journal-box-receiving recesses thereof, and connecting members between the upper chords of the side members and the downwardly bent ends of the side portions of the transoms.

12. A car truck frame including built-up side members with journal-box-receiving recesses adjacent their ends and including continuous upper chords, built-up transverse members forming transoms; said transoms having parallel horizontally disposed side portions forming the central part of the lower chords of the side members with downwardly bent ends disposed adjacent to the journal-box-receiving recesses thereof, and plate webs connecting said downwardly bent ends with the upper chords of the side members.

13. A car truck frame comprising a unitary structure consisting of longitudinal side members in spaced relation; said side members being of beam construction and each including upper and lower chords and connecting webs, and transverse transom members in spaced relation and disposed substantially at a right angle to the side members; said transom members being of beam construction and each including upper and lower chords and connecting webs; the lower chords of the side members and the upper chords of the transom members being comprised of a single plate.

14. A car truck frame comprising a unitary structure consisting of longitudinal side members in spaced relation; each of said side members being of beam construction and including upper and lower chords and connecting webs, and transverse transom members in spaced relation and disposed substantially at a right angle to the side members; said transom members being of beam construction and including upper and lower chords and connecting webs, with the lower chords of the side members and the upper chords of the transom members composed of a single plate; the upper chords of the side members having side portions inwardly bent into engagement with said plate and the ends of the lower chords of the transom members being upwardly bent into engagement with said plate.

15. A car truck frame comprising a unitary structure consisting of longitudinal side members in spaced relation; each of said side members including an upper chord and a vertical connecting web, transverse transom members in spaced relation and disposed substantially at a right angle to the side members; said transom members including a lower chord and a vertical connecting web, and a single plate substantially horizontally disposed and forming the lower chords of the side members and the upper chords of the transom members.

16. A car truck frame having side members including top and bottom elements fabricated out of substantially flat plate stock welded together and connected transoms including top and bottom elements fabricated out of flat plate stock welded together in which the bottom element of the side members is coplanar with and forms the top element of the transoms.

17. A welded car truck frame having a side member including top and bottom elements fabricated out of substantially flat plate stock and a connected transom including top and bottom elements fabricated out of substantially flat plate stock, in which the portion of the bottom element of the side members is integrally coplanar with the top element of the transom.

18. A welded car truck frame having a side member including top and bottom elements and a connected transom including top and bottom elements; said elements being fabricated out of substantially flat plate stock and in which the central portion of the bottom element of the side member is integrally coplanar with the top element of the transom.

19. A car truck frame including side members built up of substantially flat plate sections welded together and transverse members built up of substantially flat plate sections welded together; said transverse members being disposed below the plane of said side members and constituting transoms and each of said side members including a continuous unitary portion integral with an upper portion of each of said transoms.

20. A car truck frame made up of substantially flat rolled metal sections welded together and including built-up side members and built-up transverse members disposed below the plane of said side members and constituting transoms; each of said side members including a lower continuous and unitary portion integral with a continuous and unitary upper portion of each of said transoms.

21. A car truck frame including side members and a plurality of transverse members disposed below the plane of said side members and constituting transoms; each of said members being fabricated of substantially flat plate sections welded together and having substantially the contour of an I-beam in cross section and one of the chord members of said side members being in the form of a unitary plate forming a chord member of each of said transoms.

22. A car truck frame including side members and a plurality of transverse members disposed below the plane of the side members and constituting transoms; each of said members being built-up of substantially flat horizontally and vertically disposed plate sections welded together and having substantially the contour of an I-beam in cross section and one of said horizontal plate sections forming a continuous intermediate connection between the side members and the transoms.

23. A car truck comprising built-up side members fabricated of substantially flat plate sections welded together and built-up transoms fabricated of substantially flat plate sections welded together, with a flat plate of II form in plan providing a common chord element vertically intermediate the side members and the transoms.

EVERETT CHAPMAN.